March 20, 1956 K. FREY 2,738,906
METERING CARTON FOR GRANULAR MATERIALS
Filed Jan. 7, 1950 5 Sheets-Sheet 1
Fig. 1
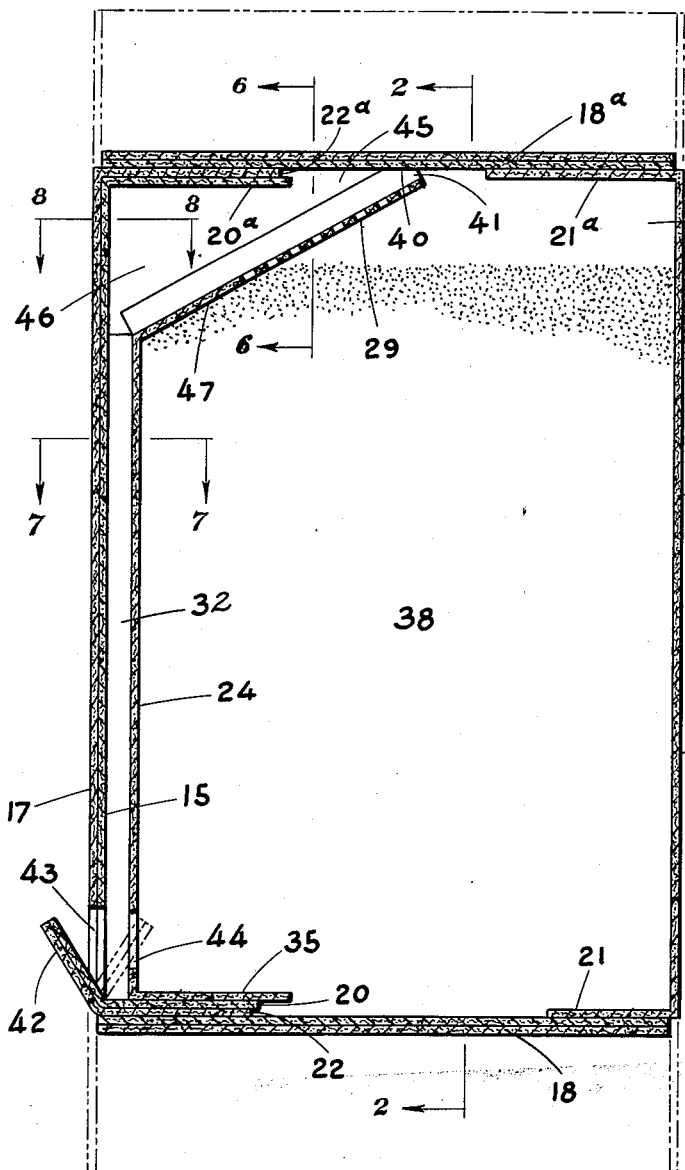
Fig. 2
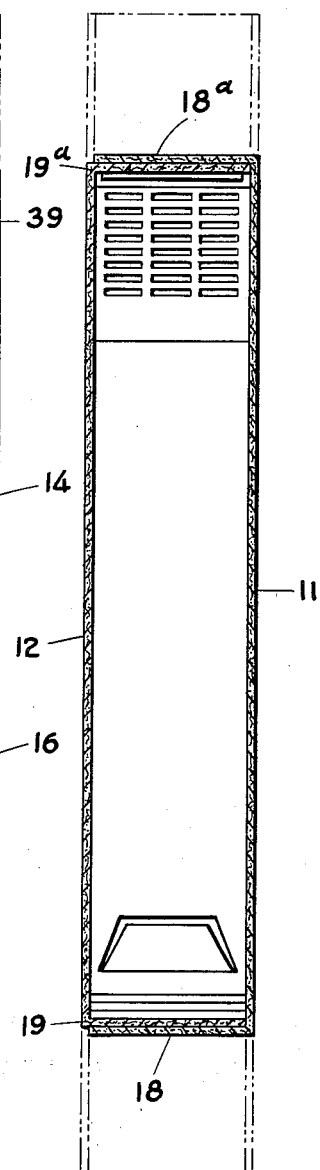
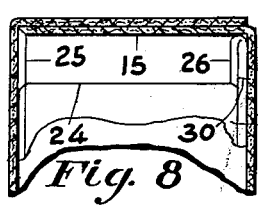
Fig. 8
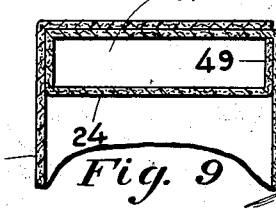
Fig. 9
KENNETH FREY
INVENTOR.
BY
ATTORNEY

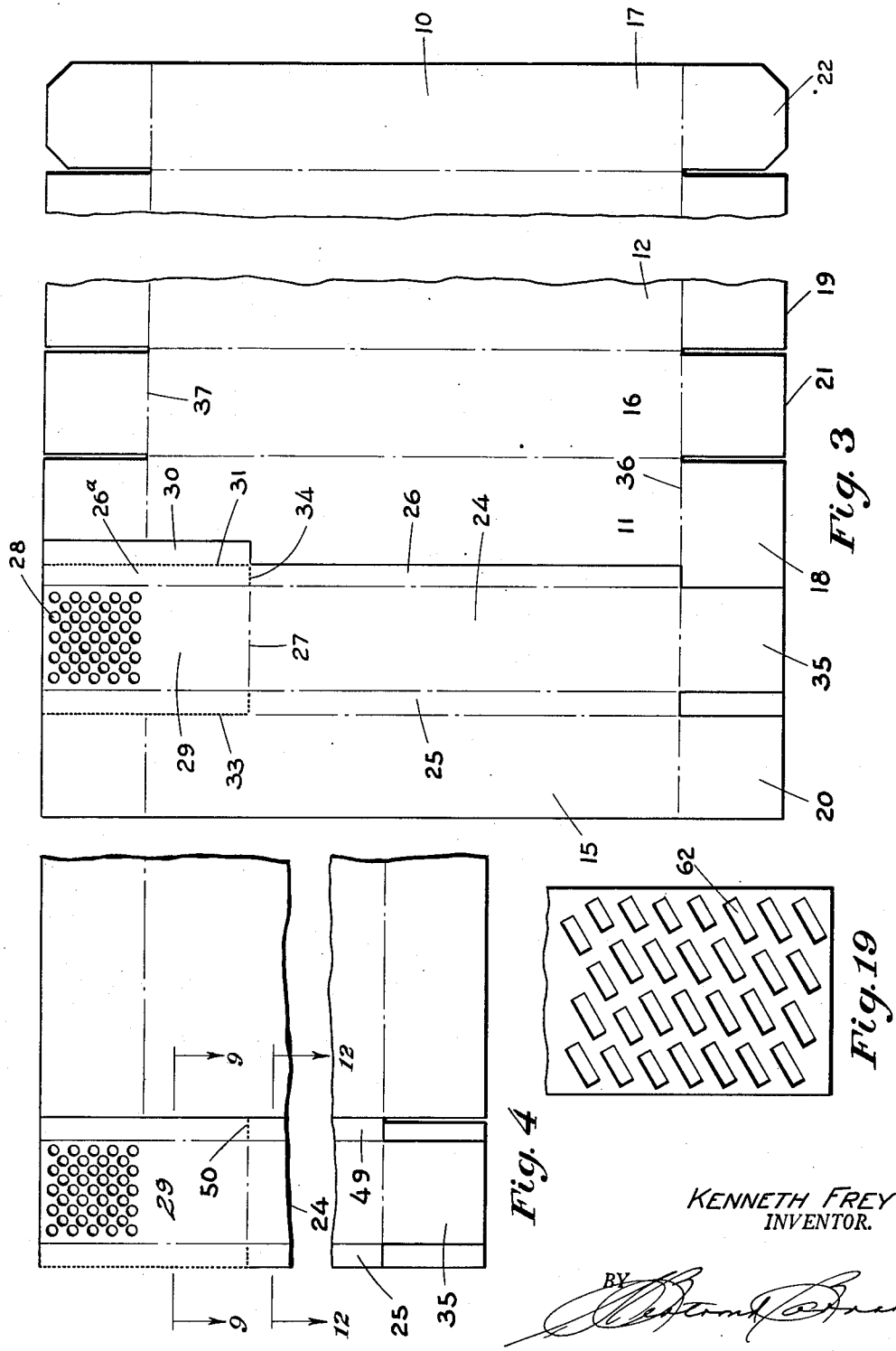

March 20, 1956 K. FREY 2,738,906
METERING CARTON FOR GRANULAR MATERIALS
Filed Jan. 7, 1950 5 Sheets-Sheet 3
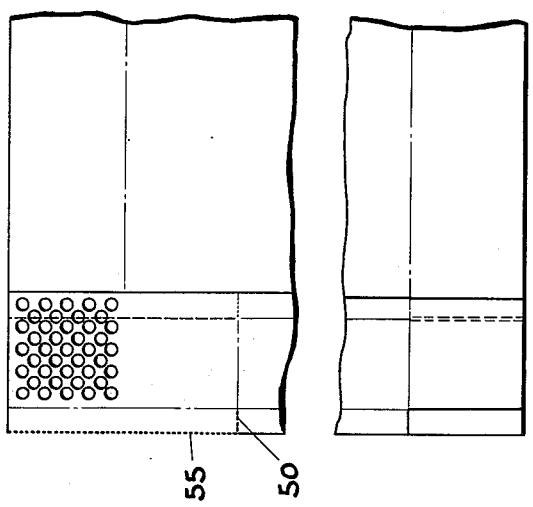
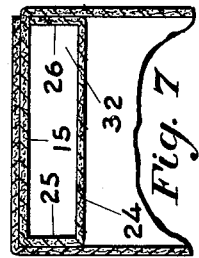
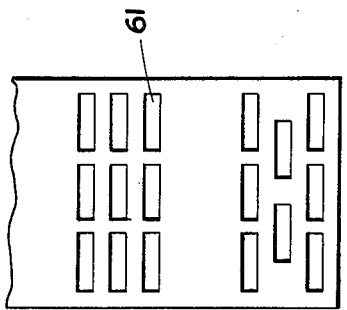
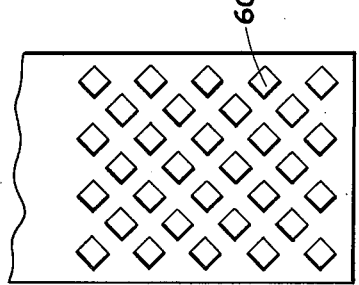
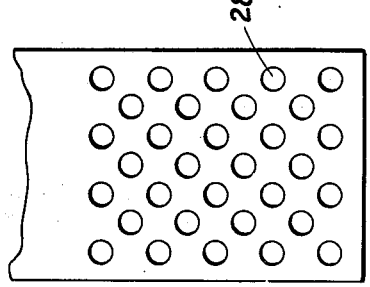
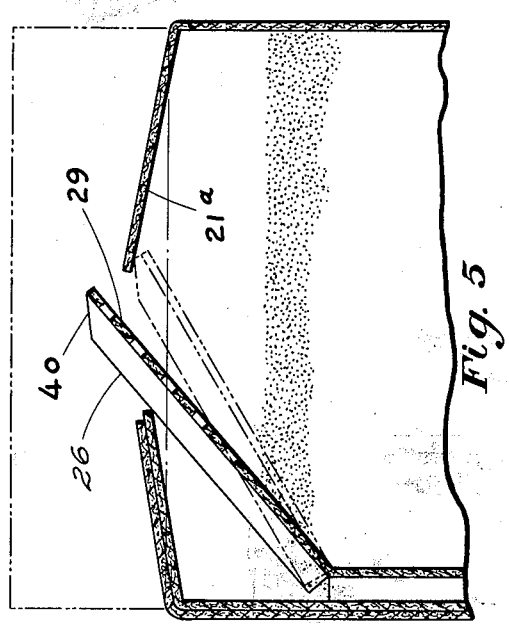
KENNETH FREY
INVENTOR.
BY
ATTORNEY March 20, 1956  K. FREY  2,738,906
METERING CARTON FOR GRANULAR MATERIALS
Filed Jan. 7, 1950  5 Sheets-Sheet 4
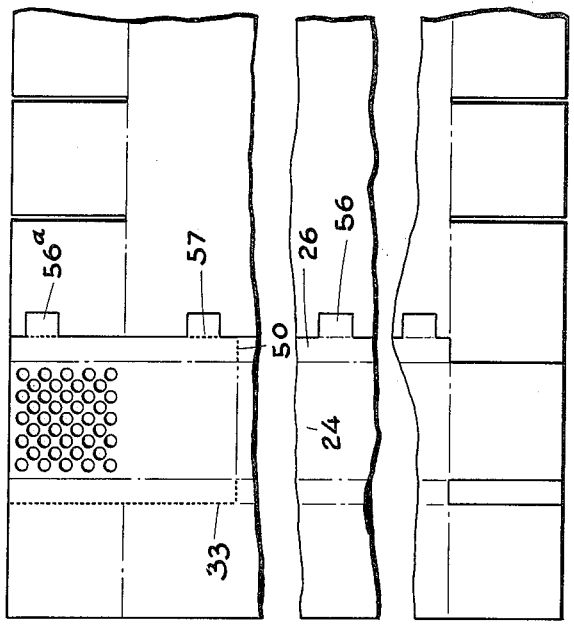
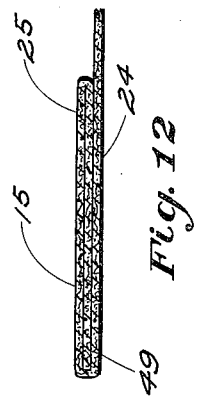
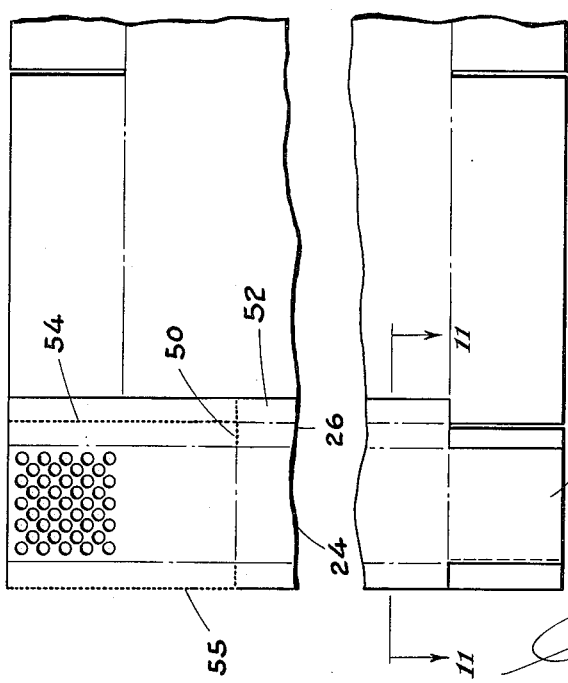
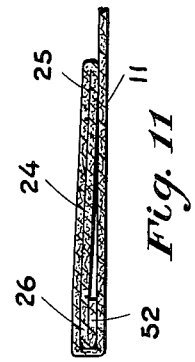
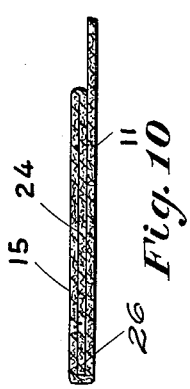
KENNETH FREY
INVENTOR.
ATTORNEY March 20, 1956  K. FREY  2,738,906
METERING CARTON FOR GRANULAR MATERIALS
Filed Jan. 7, 1950  5 Sheets-Sheet 5

KENNETH FREY
INVENTOR.

BY
ATTORNEY

United States Patent Office 2,738,906
Patented Mar. 20, 1956

2,738,906

METERING CARTON FOR GRANULAR MATERIALS

Kenneth Frey, Brooklyn, N. Y.

Application January 7, 1950, Serial No. 137,413

8 Claims. (Cl. 222—455)

This invention relates to a carton for granular materials, such as granulated soaps, which is fitted with a metering device, to enable the user to pour out a uniform, predetermined quantity of the material at each pouring operation.

While metering cartons of various types, have been available, they have been rather costly to produce, difficult to insert into the carton, and have hampered the carton manufacturing and filling operations.

The object of my invention is to provide a metering unit, formed integral with the material of the carton, in such a manner that the metering device, comes into position, when the carton walls are folded into position.

A further object is to provide a metering carton, which can be produced and folded in the conventional type of carton folding machine, with a minimum of machine modification.

A primary object is to provide a metering carton, which can be filled, and sealed in the conventional type of filling and sealing machines, with a minimum of machine modification, and without materially increasing the time required and the cost of such filling operations.

Another object is to provide a metering carton, which will dispense a predetermined, uniform quantity of the material at each tilting.

A primary object is to provide a metering carton which will retain its shape, support the material in the carton without buckling, and which is so constructed that only the desired quantity of material passes through the metering compartment at each application.

Another object is to provide a metering carton, in which an intermediate space is provided to restrain the flow of additional material from the body of the container into the metering compartment, when the container is tilted.

The accompanying drawings, illustrative of one embodiment and several modifications of my invention, together with the description of their construction and the method of utilization thereof, will serve to clarify further objects and advantages of the invention.

In the drawings:

Fig. 1 represents a vertical section through the assembled metering carton, showing the position of the flaps, before and after closing, and the method of locating the angular lower metering section of the metering unit.

Fig. 2 is a vertical section through the carton assembly of Fig. 1, taken at 2—2, Fig. 1.

Fig. 3 is a plan view of the development, of the carton and metering unit of Fig. 1, with one of the end panels and the channel panel folded over.

Fig. 4 is a plan view of a modification of the development of Fig. 3.

Fig. 5 is a vertical section through a portion of the carton of Fig. 1, showing the end flaps in the partially closed position.

Fig. 6 is a vertical section through a portion of the carton of Fig. 1, taken at 6—6, Fig. 1.

Fig. 7 is a cross-section through the channel area of Fig. 1, taken at 7—7, Fig. 1.

Fig. 8 is a cross-section through the upper end of the channel area of Fig. 1, with the angular metering section in the vertical position, taken at 8—8, Fig. 1.

Fig. 9 is a vertical section through a modified channel area, similar to Fig. 8, taken at 9—9, Fig. 4.

Fig. 10 is a cross-section through the end channel area of Fig. 7, with the channel panel folded.

Fig. 11 is a cross-section through the channel area of Fig. 13, with the panels in the folded position, taken at 11—11, Fig. 13.

Fig. 12 is a cross-section through a modification of the channel area of Fig. 4, with the panels folded, taken at 12—12, Fig. 4.

Fig. 13 is a plan view of another modification of the end and channel panels, similar to Fig. 3.

Fig. 14 is a plan view of another modification of the end and channel panels, similar to Fig. 4, with the end web folded under in the gluing position.

Fig. 15 is a plan view, similar to Fig. 3, of another modification of the end and channel panels.

Fig. 16 is a full size plan view of the openings in the channel panel of Fig. 3.

Fig. 17 is a modification of the panel of Fig. 16, with another form of opening.

Fig. 18 is a view similar to Fig. 16, with rectangular openings formed in the angular section of the panel.

Fig. 19 is a view, similar to Fig. 18, with rectangular openings located at an angle to the channel panel.

Figure 21:
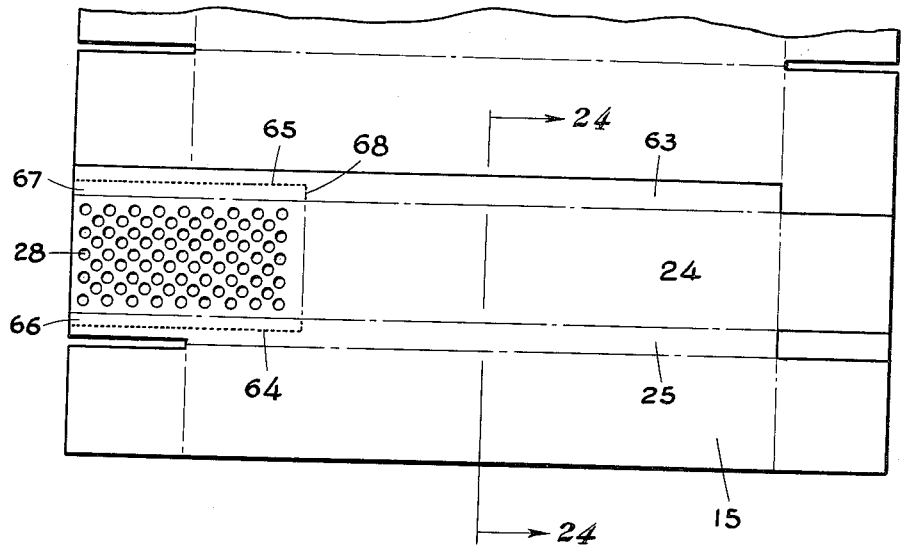
Fig. 21 is a plan view of the development of the carton and metering unit of Fig. 20, similar to Fig. 3.

It will be understood that the following description of the construction and operation of the metering carton for granular materials, is intended as explanatory of the invention and not restrictive thereof.

In the drawings, the same reference numerals designate the same parts throughout the various views, except where otherwise indicated.

One embodiment of the unit, as indicated in Figs. 1, 2, and 3, may be made up of a single sheet of cardboard 10, or other suitable material, which is divided into a pair of wide panels 11 and 12, forming the front and rear walls of the carton 14, a plurality of end panels 15, 16, and 17, forming the side walls of the assembled carton, by scoring, scribing or otherwise forming dividing lines between adjacent panels.

A pair of top and bottom flaps 18 and 19, may be formed integral with each of the front and rear panels, with similar flaps 20, 21 and 22, formed integral with each of the end panels.

Adjacent the left hand end panel 15, shown in Fig. 3, an additional panel 24, may be formed, with a spacer web 25, separating the channel panel 24, from the adjacent end panel 15, and an additional end web 26, formed integral with the opposite side of the channel panel, with score lines, scribe lines, or other forms of dividing lines, separating adjacent panels, and panel webs.

The upper portion of the channel panel 24, shown in Fig. 3, may be divided from the main panel, by a score line 27, or other suitable dividing line, a plurality of perforations or openings 28, of circular, or other suitable form, being cut through the outer portion of the panel, to form the angular metering section 29, of the metering unit, as indicated in Fig. 1, when the various panels are folded to form the assembled carton, shown in Fig. 1.

A narrow auxiliary end flap 30, extending over the length of the metering panel section, may be formed integral with the narrow web 26, which runs along the entire length of the panel proper.

Before the carton is assembled, glue, or another adhesive material may be applied to the exposed surface of the narrow spacer web 26, after which the end flap 30 may be folded along the perforated dividing line 31, to separate the outer portion of the end flap 30, from the attaching panel, the lower portion of the web 26 being attached to the inner surface of the wide panel 11, as indicated in section in the flat position, Fig. 10, before the channel panel and the adjacent webs are opened to form a channel, or passage 32, between the end panel 15 of the carton and the channel panel 24, as indicated in Fig. 7.

The line 33, separating the left-hand web 25, from the end panel 15, may also be perforated, up to the web separating line 34, to facilitate forming the angular metering section of the panel.

After the end web is glued to the wide panel 11, the carton may be folded along the score lines between panels, to form the open carton shown in Fig. 1, with the upper and lower end flaps 20, 21 and 22, extending above and below the vertical panels, as indicated by dot-dash lines, Fig. 1.

The glued main portion of the web 26, adjacent the channel panel may be attached to the inner surface of the wide panel 11 of the carton, in the manner hereinbefore described.

The lower end flaps 20, 21 and 22, and the auxiliary flap 35, formed integral with the bottom of the end panels, may be folded inward, as indicated in Fig. 1, the two wide flaps 18 and 19, being similarly folded inward, along the score lines 36 and 37, separating the flaps from the main panels, after the inner surface of one or both of the flaps is coated with glue, or other suitable adhesive, to form the bottom of the completed carton, as indicated in Fig. 1, which in reality, forms the top of the completed, filled carton, as will be hereinafter explained.

The granular soap 38, or other material, with which the carton is filled, may be inserted through the open end of the carton, as shown at the top, Fig. 1, in the conventional type of carton filling machine, the carton being vibrated during the filling process to form an open space or gap 39, between the top of the material, and the top of the carton.

After the carton is filled, the two end flaps 20a and 22a formed integral with the two left-hand end panels, may be moved angularly inward from the vertical position, shown by dot-dash lines, Fig. 1, through the angular position, shown in Fig. 5, to the final closed position, shown in Fig. 1, the ends of the flaps pressing the side webs 25 and 26, of the angular metering section of the channel panel 24, angularly downward, from the initial position, shown in Fig. 5.

In order to move the metering section 29 to the final angular position, shown in Fig. 1, the right hand upper flap 21a may be lengthened, as indicated in Fig. 5, the outer edge of the flap engaging the edge of the webs of the metering section, the flaps moving the metering section into the operating angular position, shown in Fig. 1.

After the angular metering section 29 is moved to approximately the required angular position, the two wide end flaps 18a and 19a, the inner surface of one or both of which has been coated with glue by the gluing machine, may be moved from the vertical position, shown by dot-dash lines, Fig. 1, to the closed position, the inner surface of one of the flaps engaging the chamfered corners 40, formed at the outer edge of each of the webs, thus locating the angular metering section, with relation to the closed flaps of the carton, a gap 41, being formed between the outer edge of the angular section, and the inner surface of the flaps, as indicated in Fig. 1.

Before the wide upper flaps 18a and 19a, Fig. 1, are moved to the closed position, glue or other adhesive may be applied to the inner surface of one or both of the flaps, the flaps being glued to one another to form the completed, filled carton, as indicated in Fig. 1, the upper portion, shown in Fig. 1, forming the bottom of the carton in the operating position.

A short flap 42, formed integral with each of the left-hand end panels, may be cut out of each of the panels, as indicated in Fig. 1, thus forming an opening 43, in communication with the channel passage 32, at the top of the carton, bottom Fig. 1.

A slot 44, slightly wider than the width of the flap 42, may be cut through the channel panel 24, opposite the opening 43 in the end panel, to retain the flap in the open position, thereby clearing the channel passage 32, and the opening 43, when the flap is moved angularly inward to the position, shown by dot-dash lines, Fig. 1.

With the top and bottom flaps closed and glued, as indicated in Fig. 1, the operation of the metering unit is substantially, as follows:

With the container in the vertical position, with the upper edge, Fig. 1, at the bottom, a predetermined quantity of the soap, or other granular material, flows through the openings 28 in the angular metering section 29, into the metering compartment 45, formed between the perforated portion of the angular metering section and the bottom of the carton.

When the carton is tilted toward the left-hand end panel 15, of the carton, the material in the metering compartment passes into the intermediate corner compartment 46, below the solid portion 47, of the angular metering section 29.

In this position, the material in the interior of the carton slides along the upper surface of the angular metering section, so that no appreciable amount of material is added to the metering compartment, during the tilting process.

Upon further tilting, the material in the intermediate, or corner compartment 46, and the residue in the metering compartment, pass through the channel passage 32, thence out through the opening 43, formed at the top of the left-hand end panels, bottom Fig. 1.

In order to refill the metering compartment 45, at the bottom of the carton, the carton, after the contents of the intermediate compartment has been cleared, may be restored to the vertical position, with the angular metering section at the bottom. The carton may again be tilted after the metering section is filled, in the manner hereinbefore described, after which the carton is again tilted through the respective angles, in the same manner, the material in the metering compartment, passing through the intermediate compartment, through the channel passage 32, and out through the opening 43, near the top of the carton, the process being repeated until the entire contents of the carton is discharged through the opening 43 at the top of the carton.

Figs. 4, 9, and 12 show a modification of the carton development. The end web 49, attached to the outer end of the channel panel 24, may extend over the entire length of the panel, to the beginning of the lower flap 35, as indicated in Fig. 4. The line 50, separating the main web from the portion adjoining the angular metering section 29, may be perforated, slit, deep scored, or otherwise marked to facilitate separation of the two sections of the web.

The portion of the web 49, adjoining the channel panel, may be glued up to the perforated line 50, the web being folded under to the flat position, shown in Fig. 12, and attached to the inner surface of the wide panel, after which the end carton panel 15, may be moved to its normal position, perpendicular to the wide panel 11, the channel panel forming a channel 32, adjacent the end panel, as indicated in Fig. 9.

Fig. 13 shows a carton development, similar to that of Fig. 3, except that the auxiliary end web 52, formed alongside the main web 26, of the channel panel, runs the entire length of the panel to the point of division of the lower end flap 35.

The auxiliary end web 52, may be made the same width as the other webs of the panel, or the end web may be made narrower than that of the two main webs 25 and 26.

Before forming the open carton, glue may be applied to the lower surface of the entire end web, which is attached to the inner surface of the wide panel 11 of the carton, as indicated in section in Fig. 11.

The line 59, separating the main web from the web of the metering section may be perforated, as indicated in Fig. 13, similar perforations being formed along the line 54, separating the side web 26 of the metering section, and the auxiliary web, as well as the line 55, separating the left-hand end web from the end panel of the carton, thus permitting the metering section to be moved angularly with relation to the main channel panel, as indicated in Fig. 1.

After the end panel 15 is moved to its normal carton position, the channel is formed between the end panel, and the channel panel 24, the two webs 52 and 26, forming a double thickness adjoining the wide panel 11, of the carton.

In another modification of the construction, shown in Fig. 15, a plurality of short tabs 56 are shown, adjoining the channel web 26, in place of the auxiliary end web, as shown in Fig. 13.

In forming the carton, the tabs 56 may be glued to the inner surface of the adjacent wide panel of the carton.

The dividing line 57, between the two tabs 56a, adjoining the metering section of the panel, may be perforated, as indicated in Fig. 15 similar perforations being formed along the line 33, separating the left-hand web from the adjacent carton panel, thus permitting the metering section to assume the angular position, shown in Fig. 1, when the carton is assembled.

The construction, shown in Fig. 14, is substantially the same as that of Fig. 4. The dividing line 50, between the webs adjoining the channel panel, and the portion of the webs, adjoining the metering section may be perforated, as well as the line 55, separating the left-hand web from the edge of the end panel, to permit the metering section to assume the angular position, shown in Fig. 1, when the carton is assembled.

The openings 28, formed in the outer portion of the metering panel, may be of substantially circular contour, as indicated in Figs. 3 and 16, or the openings 60, may be made square, as indicated in Fig. 17, hexagonal, triangular, diamond-shaped, or of any other suitable form, depending upon the size of the panel, the size of the openings, and the grain-size and texture of the material packed in the carton.

The spacing between the openings 28 and 60 may be varied, depending upon the material of which the carton is made, the size of the openings, and the volume of the metering compartment.

Other forms of openings may be formed in the metering section, as indicated in Figs. 18, 19, the openings 61, shown in Fig. 18, being substantially rectangular, and located perpendicular to the axis of the metering section.

The openings 61 may be staggered, as indicated in the lower portion of Fig. 18, or in rows, in substantial alignment with one another, as indicated in the upper portion of the panel of Fig. 18, the length of the openings depending upon the width of the panel, and the number of openings per row, the height of the individual openings being varied to suit the texture of the granular material packed in the carton, and the metering area required. The spacing between the openings may be varied, depending upon the size of the openings, the thickness and strength of the material of which the carton is made, and the metering volume required.

The openings 62, shown in Fig. 19, are substantially the same as those in Fig. 18, except that they are located in rows, angularly located with relation to the edge of the panel. The rows of openings may be sloped upward from the left-hand edge of the panel, as indicated in Fig. 18, or downward, depending upon design preference.

The openings may be staggered, as indicated in Fig. 19, or aligned in rows, depending upon the layout preferred. The size of the openings and the spacing between them are determined in substantially the same manner as those of Fig. 18.

Figure 20:
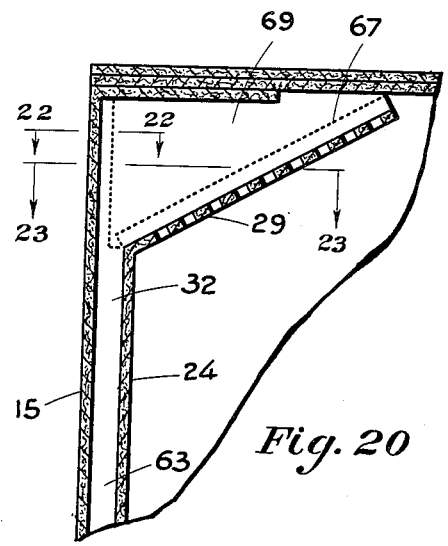
Fig. 20 is a vertical section through a portion of a modification of the carton of Fig. 1, showing the angular metering section in place.

The modified construction, shown in Figs. 20 and 21 is similar to that shown in Figs. 1, 2 and 3.

The web 63, formed integral with the metering panel 24, may be glued or otherwise attached to the wide panel 11, the opposite web 25 being glued to the outer end of the opposite panel 12, thus eliminating the outer end panel 17.

The extensions of the end webs 25 and 63, which continue along both sides of the metering section 29, of the channel panel 24 may be perforated along lines 64 and 65 near the end of the webs, thus forming two narrow webs 66 and 67, adjacent the metering section, when the metering section is moved to the angular position shown in Fig. 20.

The narrow webs 66 and 67, may be perforated along the lines 68, separating the narrow webs from the main webs, thus permitting the narrow webs to be severed from the main webs, along the perforated lines, thereby allowing the metering section to assume the angular position, shown in Fig. 20.

The circular openings 28, instead of extending over a portion of the metering section, as in Figs. 3 and 4, may be continued over the entire length of the metering section, thus eliminating the blank area of Figs. 3 and 4.

Figure 22:
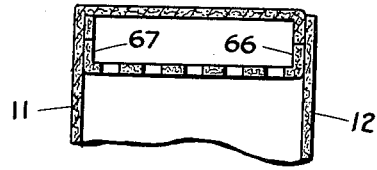
Fig. 22 is a cross-section through the channel metering section of Fig. 20, with the metering section in the initial vertical position, taken at 22—22, Fig. 20.
Figure 23:
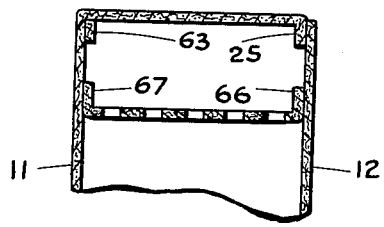
Fig. 23 is a cross-section, similar to Fig. 22, with the angular metering section canted slightly from the vertical position shown in Fig. 22, taken at 23—23, Fig. 20.
Figure 24:
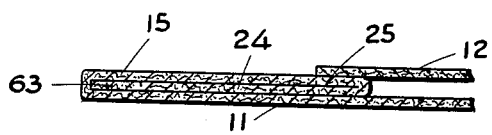
Fig. 24 is a cross-section through the end channel area of Fig. 20, with the channel panel folded flat, taken at 24—24, Fig. 21.

In forming the carton, the end web 63 of the channel panel, may be glued to the wide panel 11, of the carton, in the position, shown in Fig. 24, after which the channel area may be opened to the position shown in Fig. 22, with the metering section 29, parallel to the end panel 15.

After the perforated lines 64, 65 and 68 of the narrow webs 66 and 67 of the metering section are severed, the metering section may be moved to the angular position shown in Fig. 20, in substantially the same manner as that shown in Figs. 1 and 5, and hereinbefore described.

The operation of the assembled unit is substantially the same as that of Fig. 1, except that the intermediate compartment 46, under the blank area of the metering section is eliminated, the metering compartment 69, extending under the entire length of the metering section.

The construction of the metering section, shown in Figs. 20 and 21, may be used with any of the carton and metering units, shown in the other drawings and hereinbefore described.

The openings 28, 60, 61 and 62, shown extending over a portion of the metering section of Figs. 16, 17, 18, and 19, may be continued along the entire length of the metering section, thus eliminating the solid area 47, and the intermediate compartment under it.

Thus, the metering construction, shown in Fig. 20, may be used interchangeably with those shown in Figs. 1, 2, 3 and 4, the operation of the carton metering unit being substantially the same as that of the carton shown in Figs. 1, 2, 3 and 4.

The size of the metering compartment 45, and the angular position of the metering section 29, with relation to the bottom of the container are determined by the length of the metering section and the height of the webs formed at both sides of the metering section. Thus, the area of the metering compartment may be varied by increasing or decreasing the height of the side webs of the metering section, or by altering the position or angle of the chamfer formed at the outer edge of each of the webs.

The method of assembling the container, using the developments shown in Figs. 4, 13, 14 and 15, is substantially the same as that of Fig. 3, and hereinbefore described, except for the method of attaching the end webs, or the auxiliary webs of the channel panels to the front or rear panel of the carton.

The closing of the bottom flaps of the carton, the filling of the carton, and the closing of the top flaps, are substantially the same as that of the carton of Fig. 1, the only difference being in the method of moving the angular metering section from the vertical position, to the augular position, shown in Fig. 1, which is determined by the relation between the length of the metering panel section, and the two side panel flaps of the carton, as hereinbefore described.

The openings formed in the metering section, serve to sift the material contained in the interior of the carton, as it passes into the metering compartment, thus restraining any lumps of soap, or other material, which may have formed, thereby preventing the clogging of the discharge passage, and the outlet opening, at the top of the carton.

The size and shape of the vertical passage, or channel, would depend upon the size and cross-section of the carton, the size, contour and location of the discharge opening at the top of the container, and the rate of discharge of each batch of material in the metering compartment, which is desired.

On all dividing lines between panels, or other sections of the unit, in the interior of the carton, the lines may be scored on either side of the sheet, or extremely thin knife slots may be cut through, along the line of separation, to facilitate bending, while still restraining the flow of granular material through the joints.

Wherever scoring is specified, the sheet material may be scored on the inner or outer side, depending upon the nature and texture of the cardboard, or other material used, the location of the particular panel, and the degree of bend required.

The carton and metering unit may be formed of a single sheet of cardboard, a plastic material, or other suitable material, cut out in the form, shown in Figs. 3 and 4, or the modifications thereof shown in the other views, or the channel panel, the adjacent webs, and the metering panel section, may be formed of a separate material, joined to the main body panels of the carton by gluing, heat sealing, or other suitable means.

The carton shown in Fig. 1, may be of rectangular, square, or other suitable cross-section, depending upon the size of the carton, the amount of granular material contained therein, the amount of material to be discharged at each tilting and the rate of discharge, and the desired appearance.

The size and area of the intermediate corner compartment 46, is determined by the size of the blank area of the metering panel, the angular position of the panel, and the height, between the score line at the junction edge of the panel, and the bottom of the container.

The area of this compartment may be varied by varying the height of the blanked section of the panel, the overall length of the metering panel section, or the height of the panel webs.

It will be apparent to those skilled in the art that my present invention is not limited to the specific details described above and shown in the drawings, and that various further modifications are possible in carrying out the features of the invention without departing from the spirit and scope of the appended claims.

What I claim is:

1. A container for dispensing predetermined quantities of granular materials, comprising a body of rectangular cross-section, having side, top and bottom walls, formed of a single sheet of material, an auxiliary panel formed integral with one of said side walls, webs formed integral with said panel spacedly locating the panel from the body wall to form a discharge passage adjacent the body end wall, means attaching said panel to one wall of said body, a metering section formed integral with said auxiliary panel, said metering section being angularly located with relation to the auxiliary panel, a portion of said metering section having a plurality of openings formed therethrough, the area between said metering section and the adjacent walls of the container being in communication with the passage, one wall of said container, adjacent the passage, having an opening formed therethrough, and a closure flap formed integral with said wall, said flap being adapted to close the opening.

2. A container for dispensing predetermined quantities of granular materials, comprising a container body of rectangular cross-section, having side, front and rear, top and bottom walls, formed of a single sheet of material, an auxiliary panel formed integral with one of said side walls, webs formed integral with said panel, spacedly located the panel, between the side walls, to form a passage, adjacent one end wall, means attaching said panel to one wall of the container, a metering section formed integral with said auxiliary panel, the metering section being located between the front and rear container walls, adjacent the bottom wall thereof, said metering section being angularly located with relation to the auxiliary panel, the level of the metering section at the auxiliary panel being considerably above the bottom container wall, a portion of said metering section having a plurality of openings formed therethrough, the portion of the metering section adjacent the auxiliary panel being blank, the area between the perforated portion of said metering section, and the adjacent container walls, forming a metering compartment, the area adjacent said metering compartment between the blank section of the metering section and the adjacent container walls, forming an intermediate compartment, connecting the metering compartment with the discharge passage, one wall of said container, adjacent the passage, having a discharge opening formed therethrough, and a closing flap formed integral with said wall, said flap being adapted to close the opening.

3. A carton for dispensing predetermined quantities of granular materials, contained therein, comprising a body having side, front and rear, top and bottom walls formed of a single sheet of material, an auxiliary panel formed integral with one of said walls, said panel extending between opposite side walls of the container, a pair of webs, formed integral with said panel, spacedly locating the panel from the adjacent body wall, to form a discharge passage therebetween, means attaching one of said panel webs to the adjoining body wall, a metering element formed integral with said auxiliary panel, said metering element being located between the front and rear container walls, said metering element being angularly located, relative to the panel, a portion of said metering element having a plurality of openings formed therethrough, the portion of the metering element adjacent the auxiliary panel being blank, the area between said perforated section, and the adjacent container walls forming a metering compartment, the adjacent area, under the blank portion of said element forming an intermediate compartment, connecting the metering compartment with the passage, one wall of the container, adjacent the passage, having an outlet opening formed therethrough, opposite the metering element, a closure flap formed integral with said wall, said flap being adapted to normally close the outlet opening, and means retaining said flap in the open position across the passage.

4. A container for dispensing predetermined quantities of granular materials, comprising a body having side, front and rear, top and bottom walls, formed of a single sheet of material, an auxiliary panel formed integral with one of said side walls, webs formed integral with said panel, spacedly locating the panel, between the side walls, to form a passage adjacent one end wall, a flap formed integral with one of said webs, said flap being adapted for attachment to one wall of the container, and a metering element formed integral with said auxiliary panel, said metering element being located between the front and rear container walls, said metering element being angularly located with relation to the auxiliary panel, the panel webs extending along said element, the portion of said web, abutting the metering element, being separable from the adjacent container panel, a section of said metering element having a plurality of openings formed therethrough, the portion of the metering element adjacent the auxiliary panel being blank, the area between the perforated section of said element, and the adjacent container walls, forming a metering compartment, the area adjacent said metering compartment, between the blank section of the metering element and the container walls, forming an intermediate compartment, connecting the metering compartment with the discharge passage, one wall of said container, adjacent the passage having a discharge opening formed therethrough, a metered quantity of the material passing into the metering compartment, into the intermediate compartment, through the passage, thence through the discharge opening, when the container is successively tilted.

5. A container for dispensing predetermined quantities of granular materials, comprising a body having side, front and rear, top and bottom walls, formed of a single sheet of material, an auxiliary panel formed integral with one of said walls, webs formed integral with said panel, spacedly locating the panel substantially parallel to the adjacent body wall, to form a discharge passage, one of the panel webs being glued to one wall of said body, a metering element formed integral with said auxiliary panel, said panel webs extending along the sides of the metering element, a flap formed integral with one of the webs located adjacent the metering element, said flap being adapted to fold against the web, to permit the metering element to be separated from the container wall, said metering element being adapted for tilting into an angular position with relation to the container base, after the container is filled, said metering element being located between the front and rear container walls, a portion of said metering element having a plurality of openings formed therethrough, the portion of the metering element adjacent the auxiliary panel being blank, the area between the perforated portion of said element and the adjacent container walls, forming an intermediate compartment in communication with the discharge passage, one wall of said container, adjacent the passage, having an outlet opening formed therethrough, and a closure flap, formed integral with said wall, said flap being adapted to normally close the outlet opening.

6. A carton for dispensing predetermined quantities of granular materials, contained therein, comprising a body having side, front and rear, top and bottom walls formed of a single sheet of material, an auxiliary panel formed integral with one of said walls, said panel extending between opposite side walls of the container, a pair of webs, formed integral with said panel, spacedly locating the panel from the adjacent container wall, to form a discharge passage, a flap formed integral with one of said panel webs, said flap being adapted for attachment to the adjoining container wall, a metering element formed integral with said auxiliary panel, said metering element being angularly located, relative to the panel, the panel webs extending along the auxiliary element, the portion of said webs, adjoining the metering element, being adapted for ready detachment from the adjoining container panel and the flap, said metering element being located between the front and rear container walls, a section of said metering element having a plurality of openings formed therethrough, the portion of the metering element adjacent the auxiliary panel being blank, the area between said perforated section and the adjacent container walls forming a metering compartment, the adjacent area, under the blank portion of the element, forming an intermediate compartment, connecting the metering compartment with the passage, one wall of the container, adjacent the passage, having an opening formed therethrough, opposite the metering element, a closure flap formed integral with said wall, said flap being adapted to normally close the opening, and means retaining said flap in the open position across the passage.

7. A container for dispensing a predetermined quantity of granular materials, comprising a body of rectangular cross-section, having side and end walls, with flaps formed integral with the side and end walls, said flaps, when folded forming the top and bottom of the container, said side and end walls and flaps being cut out of a single sheet of material, an auxiliary panel formed integral with one of said side walls, a pair of webs formed integral with the side of said panel, spacedly locating the panel, between the side walls, to form a discharge passage adjacent one end wall, means attaching one of said auxiliary panel flaps to the adjacent side wall of the container, and a metering section formed integral with said auxiliary panel, said metering section having a plurality of openings formed therethrough, the area between said metering section and the adjacent container walls forming a metering compartment, in direct communication with the discharge passage, one wall of said container, adjacent the discharge passage, having a dispensing outlet formed therethrough, said body walls, flaps, and auxiliary panel being adapted to be folded relatively flat before the top and bottom flaps are folded into the closing position, the material in the metering compartment flowing through the passage, and out through the dispensing outlet when the container is successively tilted.

8. A container for dispensing a predetermined quantity of granular materials, comprising a body of rectangular cross-section, having side and end walls, with flaps formed integral with the side and end walls, said flaps, when folded forming the top and bottom of the container, said side and end walls and flaps being cut out of a single sheet of cardboard, an auxiliary panel formed integral with one of said side walls, a pair of webs formed integral with the side of said panel, spacedly locating the panel, between the side walls, to form a discharge passage adjacent one end wall, means attaching one of said auxiliary panel flaps to the adjacent side wall of the container, and a metering section formed integral with said auxiliary panel, said metering section having a plurality of uniformly spaced openings cut therethrough, a pair of flaps formed integral with said metering section, means attaching said flaps to the side walls of the container, the area between said metering section and the adjacent container walls forming a metering compartment, in direct communication with the discharge passage, one wall of said container, adjacent the discharge passage, having a dispensing outlet formed therethrough, said body walls, flaps, and auxiliary panel being adapted to be folded relatively flat before the top and bottom flaps are folded into the closing position, the material in the metering compartment flowing through the discharge passage, and out through the dispensing outlet, when the container is successively tilted.

References Cited in the file of this patent

UNITED STATES PATENTS

| | | |
|---|---|---|
| 601,884 | Tucker | Apr. 5, 1898 |
| 1,916,230 | Murray | July 4, 1933 |
| 1,931,270 | Rice | Oct. 17, 1933 |
| 1,983,707 | Rice | Dec. 11, 1934 |
| 2,022,031 | Fisher | Nov. 26, 1935 |
| 2,393,262 | Percy | Jan. 22, 1946 |

FOREIGN PATENTS

| | | |
|---|---|---|
| 467,317 | Germany | Oct. 4, 1928 |
| 537,330 | Great Britain | June 17, 1941 |